United States Patent
Hohjoh

(10) Patent No.: US 9,479,682 B2
(45) Date of Patent: Oct. 25, 2016

(54) VIDEO SIGNAL PROCESSING DEVICE AND DISPLAY APPARATUS

(75) Inventor: Naohiro Hohjoh, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 448 days.

(21) Appl. No.: 14/117,903

(22) PCT Filed: May 14, 2012

(86) PCT No.: PCT/JP2012/062336
§ 371 (c)(1),
(2), (4) Date: Nov. 15, 2013

(87) PCT Pub. No.: WO2012/157618
PCT Pub. Date: Nov. 22, 2012

(65) Prior Publication Data
US 2014/0092310 A1 Apr. 3, 2014

(30) Foreign Application Priority Data
May 18, 2011 (JP) ................................ 2011-111904

(51) Int. Cl.
*H04N 5/14* (2006.01)
*G09G 5/00* (2006.01)
*H04N 19/587* (2014.01)
(Continued)

(52) U.S. Cl.
CPC ............. *H04N 5/145* (2013.01); *G09G 5/00* (2013.01); *H04N 7/014* (2013.01); *H04N 19/587* (2014.11); *G09G 2340/045* (2013.01); *G09G 2340/0407* (2013.01); *G09G 2340/10* (2013.01); *H04N 7/0127* (2013.01); *H04N 19/436* (2014.11)

(58) Field of Classification Search
CPC ............. H04N 19/436; H04N 7/0127; G09G 2340/0407; G09G 2340/045; G09G 2340/10
See application file for complete search history.

(56) References Cited

U.S. PATENT DOCUMENTS

2003/0202605 A1* 10/2003 Hazra ................... H04N 7/014
375/240.26
2008/0225950 A1* 9/2008 Zhu ...................... H04N 19/159
375/240.14

(Continued)

FOREIGN PATENT DOCUMENTS

| JP | 2000312311 A | 11/2000 |
| JP | 2009260550 A | 11/2009 |

(Continued)

OTHER PUBLICATIONS

International Search Report PCT/ISA/210 for International Application No. PCT/JP2012/062336 Dated May 14, 2012.
(Continued)

*Primary Examiner* — Neil Mikeska
(74) *Attorney, Agent, or Firm* — Harness, Dickey & Pierce, P.L.C.

(57) ABSTRACT

A video signal processing device according to an embodiment of the present invention includes a motion vector detection unit and a plurality of interpolated image generation units. The motion vector detection unit detects an interpolated motion vector which represents a motion between a first broad image and a second broad image. Each of the interpolated image generation units generates an interpolated partial image corresponding to a divided area by using a first partial image of a first frame, a second partial image of a second frame, and the interpolated motion vector.

12 Claims, 10 Drawing Sheets

(51) Int. Cl.
 *H04N 7/01* (2006.01)
 *H04N 19/436* (2014.01)

(56) References Cited

U.S. PATENT DOCUMENTS

2009/0110076 A1* 4/2009 Chen .................. G06T 7/20
 375/240.16
2010/0316125 A1* 12/2010 Chappalli ............ H04N 19/132
 375/240.16
2011/0025910 A1* 2/2011 Furukawa ............ H04N 7/0132
 348/441
2011/0026596 A1* 2/2011 Hong .................. H04N 5/145
 375/240.16
2011/0164682 A1* 7/2011 Lu .................... H04N 19/56
 375/240.16
2011/0194612 A1* 8/2011 Tsai ................... H04N 19/59
 375/240.16

FOREIGN PATENT DOCUMENTS

JP 2009268017 A 11/2009
JP 2010212984 A 9/2010

OTHER PUBLICATIONS

Written Opinion of the International Searching Authority PCT/ISA/237 for International Application No. PCT/JP2012/062336 Dated May 14, 2012.

* cited by examiner

VIDEO SIGNAL PROCESSING DEVICE AND DISPLAY APPARATUS

TECHNICAL FIELD

The present invention relates to a video signal processing device which increases a frame rate and a display apparatus.

BACKGROUND ART

In recent years, high-definition television (HDTV) broadcasting has been provided, and a display apparatus capable of displaying a video having a resolution of 1920 horizontal pixels×1080 vertical pixels has been commercialized. Hereinafter, the video having a resolution of 1920×1080 is referred to as a Full HD (Full High Definition) video. In addition, as new high-definition video standards, standards of QFHD (Quad Full High Definition) (commonly called 4 k) having four times the number of pixels (twice the number of vertical pixels×twice the number of horizontal pixels) of Full HD and SHV (Super Hi-Vision, or UHDTV (Ultra High Definition Television)) (commonly called 8 k) having sixteen times the number of pixels (four times the number of vertical pixels×four times the number of horizontal pixels) of Full HD have been proposed. For example, when such a high-resolution (high-definition) video is processed, dividing a display screen into a plurality of areas and providing a video processing circuit for each area for parallel processing is effective.

For example, in PTL 1, a configuration is disclosed in which a two-dimensional image of each frame is divided into a plurality of areas and respective signal processing circuits for the plurality of areas divided perform image processing in parallel. Here, in order for each signal processing circuit to independently perform two-dimensional processing, such as spatial filtering, a video signal of a small area (margin) adjacent to the corresponding divided area is input to each signal processing circuit. In addition, each signal processing circuit performs processing such as spatial filtering on the corresponding divided area by using a video signal of the corresponding divided area and the video signal of the margin.

In addition, in PTL 2, a technique of performing frame rate conversion (FRC) processing to generate an interpolated frame image from preceding and succeeding frame images is disclosed. In FRC, a motion vector that represents a motion of an object or a background in a video needs to be obtained.

CITATION LIST

Patent Literature

PTL 1: Japanese Unexamined Patent Application Publication No. 2000-312311 (published on Nov. 7, 2000)
PTL 2: Japanese Unexamined Patent Application Publication No. 2010-212984 (published on Sep. 24, 2010)
PTL 3: Japanese Unexamined Patent Application Publication No. 2009-260550 (published on Nov. 5, 2009)
PTL 4: Japanese Unexamined Patent Application Publication No. 2009-268017 (published on Nov. 12, 2009)

SUMMARY OF INVENTION

Technical Problem

However, in a case where a display unit is divided into a plurality of areas and a video processing circuit is provided for each area for parallel processing, there is a problem in that the FRC processing becomes complex. This is because a motion vector obtained by the FRC processing crosses over a plurality of areas.

The present invention has been made taking the foregoing problems into consideration, and an object thereof is to realize a video signal processing device capable of performing FRC processing at a high speed with a simple chip configuration.

Solution to Problem

A video signal processing device according to the present invention includes: when different partial areas in a predetermined display area are respectively a first area and a second area, a motion vector detection unit which detects, by using a first broad image corresponding to the display area of a first frame and a second broad image corresponding to the display area of a second frame, a motion vector which represents a motion between the first broad image and the second broad image; a first interpolated partial image generation unit which generates, by using a first partial image corresponding to the first area of the first frame, a second partial image corresponding to the first area of the second frame, and the motion vector, a first interpolated partial image that is inserted between the first frame and the second frame and corresponds to the first area; and a second interpolated partial image generation unit which generates, by using a third partial image corresponding to the second area of the first frame, a fourth partial image corresponding to the second area of the second frame, and the motion vector, a second interpolated partial image that is inserted between the first frame and the second frame and corresponds to the second area.

In the above-described configuration, the motion vector detection unit can accurately detect the motion vector by using the first broad image and the second broad image corresponding to the display area, the first interpolated partial image generation unit generates the first interpolated partial image corresponding to the first area by using the first partial image and the second partial image corresponding to the first area which are parts of the display area, and the second interpolated partial image generation unit generates the second interpolated partial image corresponding to the second area by using the third partial image and the fourth partial image corresponding to the second area which are parts of the display area. Therefore, the first and second interpolated partial image generation units can generate the interpolated partial images for each corresponding area in parallel. Accordingly, the throughput of each interpolated partial image generation unit can be reduced, and a semiconductor chip for implementing the interpolated partial image generation unit can be implemented in a simple configuration. In addition, frame rate conversion processing which requires information of the images of the display area can be performed at a high speed.

Advantageous Effects of Invention

As described above, in the video signal processing device according to the present invention, the first and second interpolated partial image generation units can generate the interpolated partial images for each corresponding area in parallel. Accordingly, the throughput of each interpolated partial image generation unit can be reduced, and a semiconductor chip for implementing the interpolated partial image generation unit can be implemented in a simple configuration. In addition, frame rate conversion processing which requires information of the images of the display area can be performed at a high speed.

DESCRIPTION OF EMBODIMENTS

Embodiment 1

Hereinafter, an embodiment of the present invention will be described with reference to FIGS. 1 to 7.

In this embodiment, a display apparatus which receives a video signal having an 8 k pixel count and performs an ultra high definition display is described.

Figure 1:
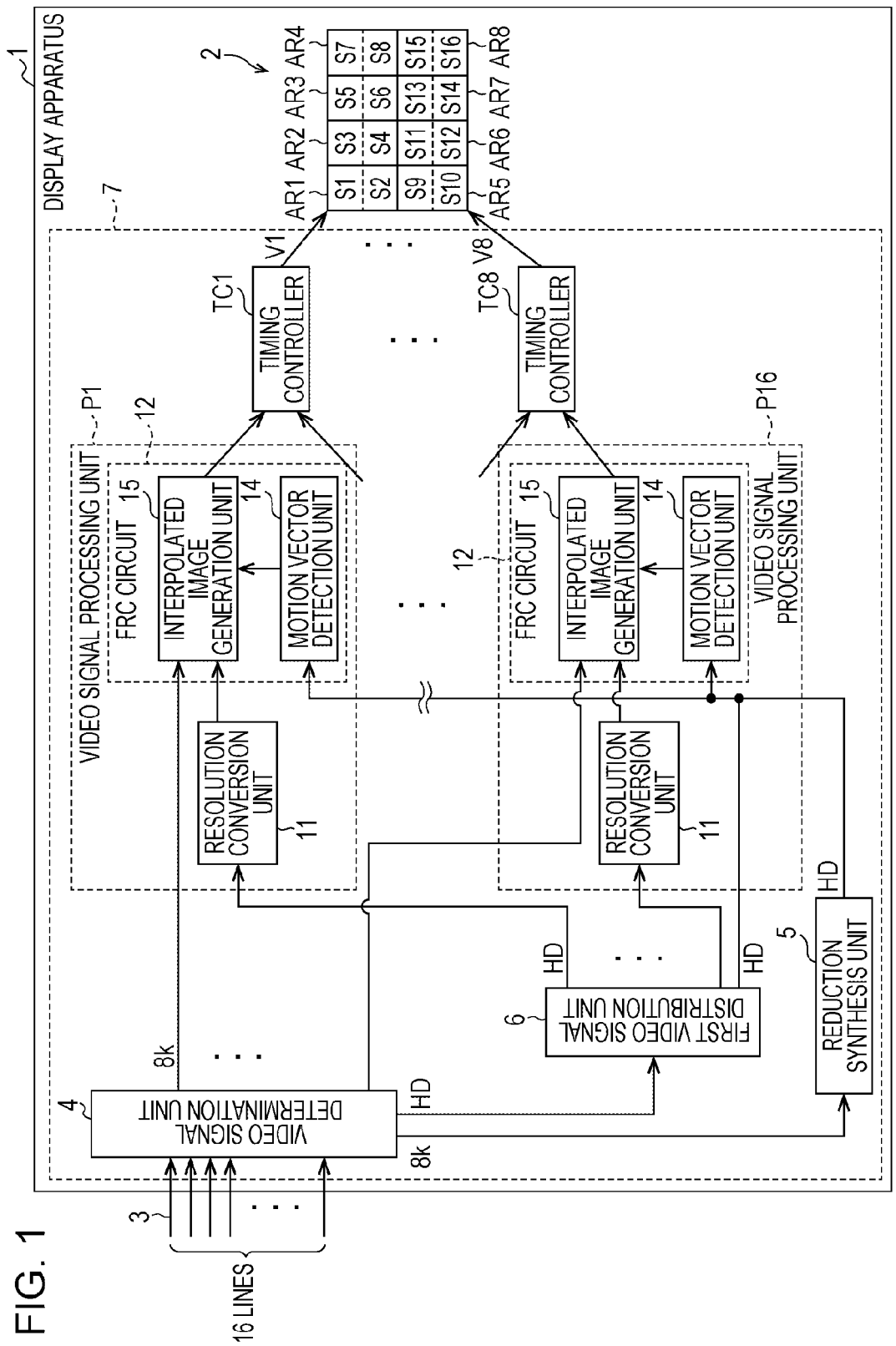
FIG. 1 is a block diagram illustrating the configuration of a display apparatus according to an embodiment of the present invention.

FIG. 1 is a block diagram illustrating the configuration of the display apparatus 1 according to this embodiment. The display apparatus 1 includes a display panel (display unit) 2 and a video signal processing device 7. The video signal processing device 7 includes a video signal determination unit 4, a reduction synthesis unit 5, a first video signal distribution unit 6, sixteen video signal processing units P1 to P16, and eight timing controllers TC1 to TC8.

Sixteen input signal lines 3 for inputting video signals from the outside are connected to the display apparatus 1. The input signal line 3 is a signal line through which a video signal having a full HD pixel count can be transmitted in real time. In a current video format, a video signal having an 8 k pixel count is divided into sixteen signals to be transmitted. For example, the video signal is divided into video signals for the respective divided areas of a display screen (7680 horizontal pixels×4320 vertical pixels) which has the 8 k pixel count and is divided into sixteen areas, and the video signals are respectively transmitted via the individual signal lines. Therefore, in this embodiment, in order to input the video signal having the 8 k pixel count, the sixteen input signal lines 3 are provided.

The display panel 2 is a liquid crystal display panel which has 7680×4320 pixels and can display an image having the 8 k pixel count. The entire display area (the entire display area or a predetermined display area) of the display panel 2 includes eight partial display areas AR1 to AR8. Furthermore, a single partial display area includes two divided areas. The partial display area AR1 includes divided areas S1 and S2, the partial display area AR2 includes divided areas S3 and S4, the partial display area AR3 includes divided areas S5 and S6, the partial display area AR4 includes divided areas S7 and S8, the partial display area AR5 includes divided areas S9 and S10, the partial display area AR6 includes divided areas S11 and S12, the partial display area AR7 includes divided areas S13 and S14, and the partial display area AR8 includes divided areas S15 and S16. Video signals are input to the respective partial display areas AR1 to AR8 by the different timing controllers TC1 to TC8 for display control. One of the divided areas S1 to S16 corresponds to a single full HD screen. The display panel 2 individually receives video signals V1 to V8 corresponding to the respective partial display areas AR1 to AR8. The display panel 2 controls a display of each of the partial display areas AR1 to AR8 according to the input video signals V1 to V8. For example, the video signal V1 represents an image displayed by the partial display area AR1.

The sixteen input signal lines 3 are connected to the video signal determination unit 4, and the video signal determination unit 4 receives a video signal from each input signal line 3. The video signal determination unit 4 determines whether the input video signal is a video signal having the 8 k pixel count or a video signal having a full HD pixel count. For example, the full HD video signal is input via a single input signal 3 line among the sixteen input signal lines 3. In addition, the video signals having the 8 k pixel count are input via the sixteen input signal lines 3. Among the video signals having the 8 k pixel count, a video signal input via a certain input signal line 3 is a video signal having a full HD pixel count (1920×1080 pixels) corresponding to any one of the divided areas S1 to S16.

The video signal processing units P1 to P16 perform various types of image processing and frame rate conversion processing on the video signals for the corresponding divided areas S1 to S16 and input video signals after being subjected to the frame rate conversion processing to the timing controllers TC1 to TC8. Each of the video signal processing units P1 to P16 includes a resolution conversion unit 11 and an FRC circuit 12. The FRC circuit 12 includes a motion vector detection unit 14 and an interpolated image generation unit (interpolated partial image generation unit) 15. Each FRC circuit 12 is constituted by an individual semiconductor chip. Detailed operations of the video signal processing units P1 to P16 will be described later.

In addition, the frame rate conversion processing mentioned here is not frame rate conversion in which the tones of a frame image of a certain frame and an interpolated frame image temporally adjacent thereto are caused to be different from each other to express a broader range of colors (to be perceived by a user) than a tone display ability of pixels, but indicates frame rate conversion in which a motion vector is obtained from two frame images and an interpolated frame image therebetween is generated.

<Case where Video Signal Having 8 k Pixel Count is Input>

In a case where a video signal having the 8 k pixel count is divided into 16 signals and input to the display apparatus 1, the video signal determination unit 4 inputs the video signals input from the sixteen input signal lines 3 to the corresponding video signal processing units P1 to P16. In addition, in the case where the video signal having the 8 k pixel count is input, the video signal determination unit 4 inputs the video signals input from the sixteen input signal lines 3 to the reduction synthesis unit 5.

Each of the sixteen video signals divided represents an image of any of the divided areas S1 to S16. Although each of the sixteen video signals divided represents an image having the full HD pixel count, the image density of an image per area of a part of the display area is the same as that of an image having an 8 k resolution. That is, the image roughness (fineness) of an image of each of the divided areas S1 to S16 represented by the divided image signals is finer (that is, an image having a higher resolution (higher definition)) than a typical image having a full HD pixel count that represents an image of the entire display screen.

The reduction synthesis unit 5 receives the video signals divided for the corresponding divided areas S1 to S16 and generates a video signal having a full HD pixel count, which represents a rough image of the entire display screen (entire display area) in a single frame. Specifically, for each frame, the reduction synthesis unit 5 converts a fine image divided for each of the divided areas S1 to S16 into an image having a low resolution (a ¼ resolution vertically and horizontally). Subsequently, the reduction synthesis unit 5 synthesizes the images of the respective divided areas S1 to S16 converted into low resolution images and generates an image having a full HD pixel count, which represents the image of the entire display screen of the corresponding frame. That is, the reduction synthesis unit 5 converts the video signal having the 8 k resolution into a video signal having the full HD resolution. The reduction synthesis unit 5 inputs the generated video signal having the full HD pixel count, which represents the image of the entire display screen, to the motion vector detection unit 14 of the FRC circuit 12 of each of the video signal processing units P1 to P16.

Here, the video signal processing units P1 to P16 receive the video signal having the 8 k pixel count overall from the video signal determination unit 4. The video signals input to the corresponding video signal processing units P1 to P16 are video signals having a full HD pixel count, which represent images of the corresponding divided areas S1 to S16. The video signal input to each of the video signal processing units P1 to P16 is input to the interpolated image generation unit 15 of the FRC circuit 12.

Here, the same video signal which represents the rough image of the entire display screen having the full HD pixel count is input to the respective motion vector detection units 14 of the video signal processing units P1 to P16. In contrast, video signals having the full HD pixel count corresponding to the divided areas S1 to S16, each of which represents a fine image of a part (an area of ¹⁄₁₆) of the display screen, are input to the respective interpolated image generation units 15 of the video signal processing units P1 to P16.

The motion vector detection unit 14 detects a motion vector from an image of a frame at a time t and an image of the preceding frame at a time t−1, on the basis of the same video signal which represents the image (broad image, entire image) of the entire display screen having the full HD pixel count. The motion vector represents the motion of each area (for example, each block of an image divided by blocks including a plurality of pixels) of an image. For example, in a case where a frame rate is doubled, the motion vector detection unit 14 detects a motion vector which represents the motion of each area (each block) of an image in an interpolated frame at a time t−½. The motion vector of each area in the interpolated frame at the time t−½ is an interpolated motion vector, which will be described later. The motion vector detection unit 14 outputs information on the detected motion vector (interpolated motion vector) to the interpolated image generation unit 15 of the corresponding video signal processing unit.

For example, the motion vector detection unit 14 of the video signal processing unit P1 obtains the motion vector from information on the image of the entire display screen having the high image roughness and does not need to exchange information with the other video signal processing units P2 to P16. In addition, since the video signal handled by the motion vector detection unit 14 is a video signal having the full HD pixel count, motion vector detection processing can be performed by using a single semiconductor chip having the same size as existing semiconductor chips. In addition, the motion vector detection unit 14 of each of the video signal processing units P1 to P16 can obtain the motion vector of the entire display screen. Since the respective motion vector detection units 14 of the video signal processing units P1 to P16 perform the same processing on the same video signal and thus detect the same motion vector, the motion vectors detected by the video signal processing units P1 to P16 are not different from each other.

The interpolated image generation unit 15 generates an image (interpolated frame image) having a low image roughness in the interpolated frame from the image having a lower image roughness by using the motion vector detected by the motion vector detection unit 14. For example, a video signal having a low image roughness corresponding to the divided area S1 which is a part (an area of ¹⁄₁₆) of the display screen is input as the video signal to the interpolated image generation unit 15 of the video signal processing unit P1. Therefore, the interpolated image generation unit 15 of the video signal processing unit P1 can generate, for example, an interpolated frame image having a low image roughness at the time t−½ from the images having a low image roughness at the time t and at the time t−1. In addition, the interpolated image generation unit 15 of the video signal processing unit P1 generates an interpolated frame image of the corresponding divided area S1. In the same manner, the interpolated image generation units 15 of the other video signal processing units P2 to P16 generate interpolated frame images (interpolated partial images) of the corresponding divided areas S2 to S16.

The interpolated image generation units 15 sequentially output the generated video signal of the interpolated frame image having the low image roughness and the video signal of the original frame input from the video signal determination unit 4 to the corresponding timing controllers TC1 to TC8. For example, the interpolated image generation units 15 of the two video signal processing units P1 and P2 corresponding to the partial display area AR1 (the divided areas S1 and S2) output the frame rate-converted video signals to the timing controller TC1 corresponding to the partial display area AR1.

The timing controllers TC1 to TC8 respectively output the frame rate-converted video signals received from the FRC circuits 12 to the display panel 2 at predetermined timings so as to correspond to the partial display areas AR1 to AR8 in order to allow the display panel 2 to display an image. In addition, the timing controllers TC1 to TC8 operate in synchronization with each other.

<Case where Full HD Video Signal is Input>

In a case where a full HD video signal is input to the display apparatus 1, the video signal determination unit 4 outputs the input full HD video signal to the first video signal distribution unit 6.

The first video signal distribution unit 6 distributes the input full HD video signal to the resolution conversion unit 11 of each of the video signal processing units P1 to P16. The full HD video signals distributed to the video signal processing units P1 to P16 are the same video signal which represents the image of the entire display screen. In addition, the first video signal distribution unit 6 also outputs the same input full HD video signal to the motion vector detection units 14 of the video signal processing units P1 to P16. Otherwise, each of the video signal processing units P1 to P16 may be configured to distribute the full HD video signal received from the first video signal distribution unit 6 to the resolution conversion unit 11 and the motion vector detection unit 14.

The resolution conversion unit 11 increases the resolution of a video signal having a high image roughness to be converted into a video signal having a low image roughness according to the display panel 2. Therefore, in a case where the resolution conversion unit 11 of each of the video signal processing units P1 to P16 receives a full HD video signal, the resolution conversion unit 11 enlarges a corresponding part (1/16 of the display screen) of the corresponding divided areas S1 to S16 of the image having the full HD pixel count (the entire display screen) to increase the pixel count thereof, thereby generating an image having a low image roughness for each of the divided areas S1 to S16. For example, the resolution conversion unit 11 of the video signal processing unit P1 enlarges a part corresponding to the divided area S1 of the input image having the full HD resolution to increase the resolution thereof (four times vertically and horizontally), thereby generating an image having a low image roughness for the divided area S1. The increase of the pixel value of the pixels is generated by a superresolution technique or the like. The resolution conversion units 11 output the video signals of the corresponding divided areas S1 to S16 to the interpolated image generation units 15.

Here, the same video signal which represents the image of the entire display screen having the full HD pixel count are input to the respective motion vector detection units 14 of the video signal processing units P1 to P16, as in the case where the video signal having the 8 k pixel count is input to the display apparatus 1. Therefore, as in the above-described case, each motion vector detection unit 14 detects a motion vector on the basis of the same video signal which represents the image of the entire display screen having the full HD pixel count and outputs information on the detected motion vector to the interpolated image generation unit 15 of the corresponding video signal processing unit.

The video signals having a low image roughness corresponding to the divided areas S1 to S16, each of which represents a part (an area of 1/16) of the display screen, are input to the respective interpolated image generation units 15 of the video signal processing units P1 to P16, and the motion vectors are input from the motion vector detection units 14. Therefore, as in the above-described case where the video signal having the 8 k pixel count is input to the display apparatus 1, the interpolated image generation units 15 generate interpolated frame images (an image having the full HD pixel count per single divided area) having the 8K pixel count overall for the corresponding divided areas S1 to S16.

In addition, in the same manner, the interpolated image generation units 15 sequentially output the generated video signal of the interpolated frame image having the low image roughness and the video signal of the original frame input from the resolution conversion unit 11 to the corresponding timing controllers TC1 to TC8.

Processing of the timing controllers TC1 to TC8 is performed in the same manner as in the above-described case where the video signal having the 8 k pixel count is input to the display apparatus 1.

<Frame Rate Conversion Processing>

Hereinafter, frame rate conversion processing will be described.

Figure 2:
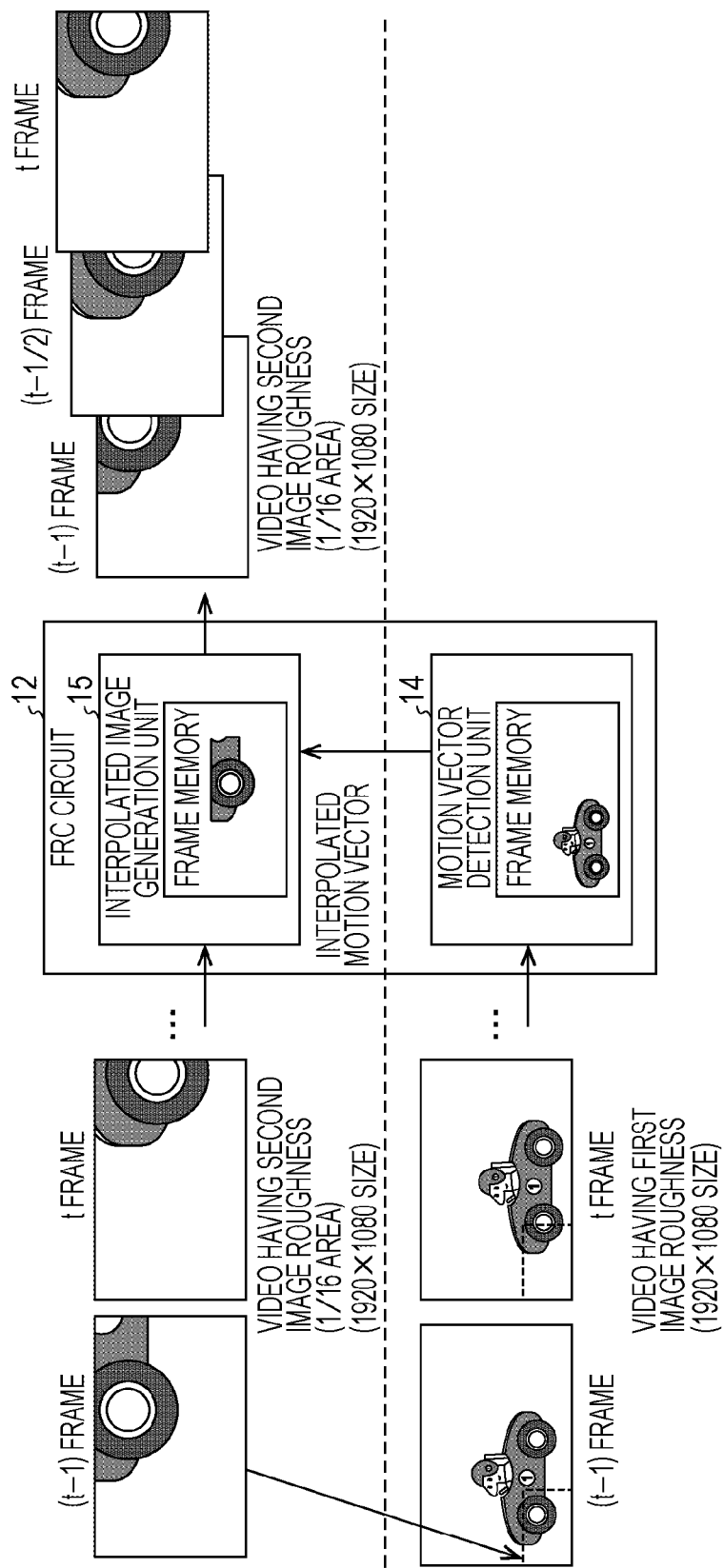
FIG. 2 is a diagram schematically illustrating a video signal input to an FRC circuit and a video signal after being subjected to frame rate conversion, which is output from the FRC circuit.

FIG. 2 is a diagram schematically illustrating a video signal input to the FRC circuit 12 and a video signal after being subjected to frame rate conversion, which is output from the FRC circuit 12. A video signal (1920×1080 pixels) having the full HD pixel count, which represents the entire display screen of each frame, is input to the motion vector detection unit 14 of the FRC circuit 12. In contrast, a video signal (1920×1080 pixels) having the full HD pixel count, which represents a single divided area (an area of 1/16 of the entire display screen) of each frame, is input to the interpolated image generation unit 15 of the FRC circuit 12. The motion vector detection unit 14 and the interpolated image generation unit 15 store the input images (the image having the full HD pixel count for the entire display screen and the image having the full HD pixel count for the divided area) of each frame in their respective frame memories.

The image having the full HD pixel count for the entire display screen, which is input to the motion vector detection unit 14, is referred to as a first image roughness, and the image having the full HD pixel count for a single divided area, which is input to the interpolated image generation unit 15, is referred to as a second image roughness which is lower than the first image roughness.

The interpolated image generation unit 15 generates an interpolated frame image having the second image roughness for an interpolated frame (a frame at the time t−½). The FRC circuit 12 alternately arranges the input image of the original frame and the image of the interpolated frame for the corresponding divided area and outputs a frame rate-converted video signal having the second image roughness. In the following, an example of processing of the motion vector detection unit 14 and the interpolated image generation unit 15 will be described in detail.

First, the motion vector detection unit 14 obtains a motion vector which represents how an object moves between the image of the frame at the time t and the image of the frame at the time t−1, by using the image of the entire display screen having the full HD pixel count. In addition, detection of the motion vector can be performed by applying a well-known interpolated image interpolation technique. An example of the detection of the motion vector is described below.

Figure 3:
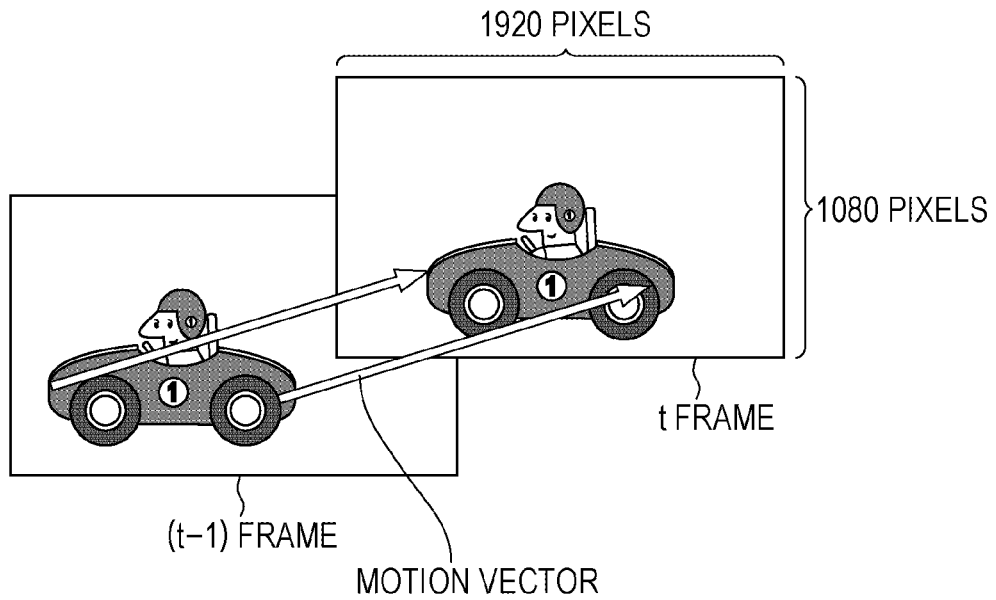
FIG. 3 is diagram illustrating an image of a frame at a time t−1, an image of a frame at a time t, and a motion vector therebetween.

The motion vector detection unit 14 divides the image of each frame into a plurality of blocks. Each block includes, for example, 4 to 32×4 to 32 pixels. FIG. 3 is a diagram illustrating the image of the frame at the time t−1, the image of the frame at the time t, and the motion vector therebetween. For example, a certain motion vector between the frame at the time t−1 and the frame at the time t is represented by a vector having any block of the frame at the time t−1 as the start point and any block of the frame at the time t as the end point.

Figure 4:
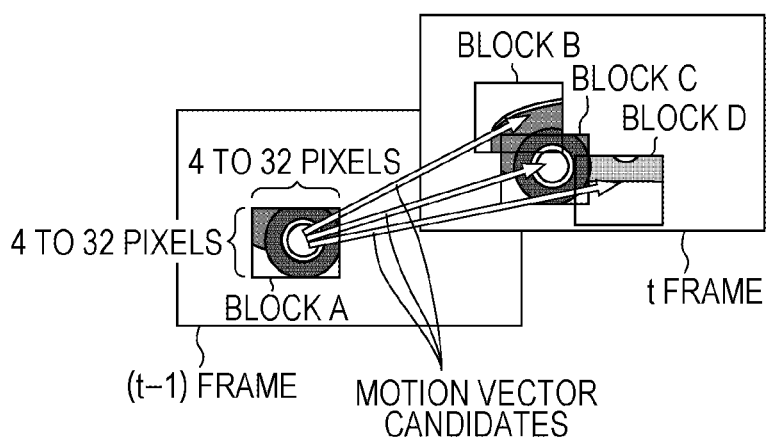
FIG. 4 is a diagram illustrating a process of detecting the motion vector for a certain block of the frame at the time t−1.

FIG. 4 is a diagram illustrating a process of detecting the motion vector for a certain block of the frame at the time t−1. A vector to each block of the frame at the time t from a block A of the frame at the time t−1 is a candidate for the motion vector. By using a block matching method, a similarity in pixel values between each block (for example, B to D) of the frame at the time t and the block A of the frame at the time t−1 is obtained. The similarity in pixel values is obtained from the sum of differences in luminance value between pixels having the same position in the blocks. For the block A of the frame at the time t−1, a block C of the frame at the time t having the greatest similarity (the sum of the differences is minimized) is specified as the destination of the block A of the frame at the time t−1. In addition, a vector from the block A of the frame at the time t−1 to the block C of the frame at the time t is detected as an optimal motion vector to represent motion of the block A of the frame at the time t−1.

Figure 5:
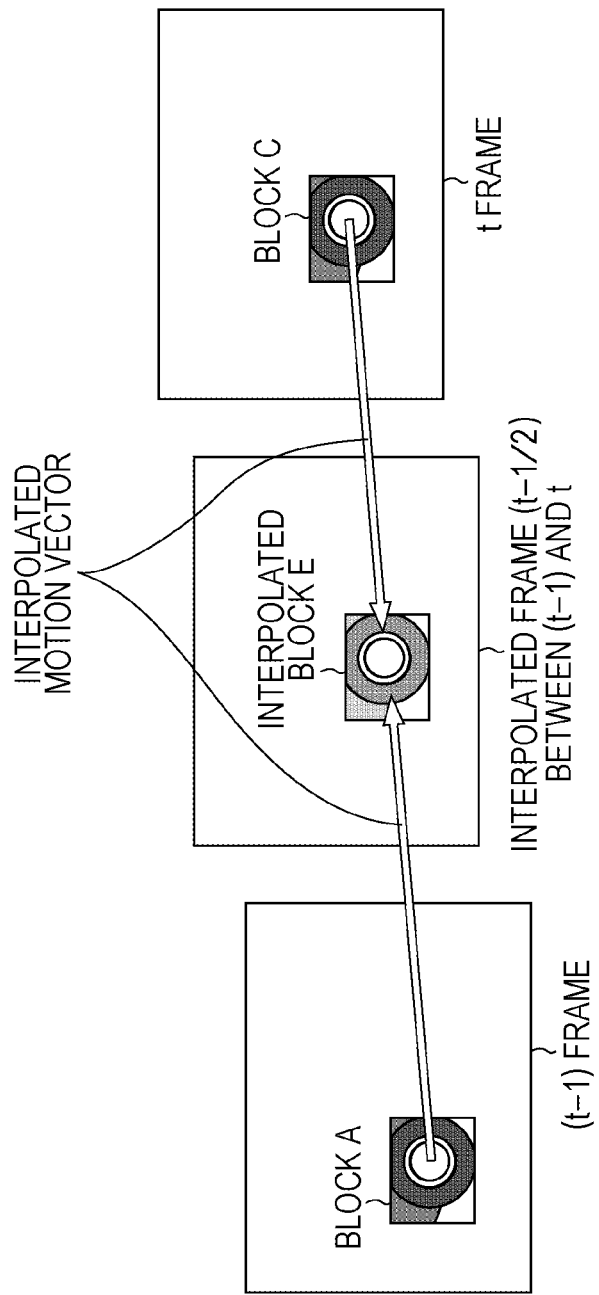
FIG. 5 is a diagram illustrating a process of detecting an interpolated motion vector in a certain block E of an interpolated frame.

FIG. 5 is a diagram illustrating a process of detecting an interpolated motion vector in a certain interpolated block E of the interpolated frame. The motion vector detection unit 14 sets interpolated blocks which divide the area of the image into a plurality of areas even for the interpolated frame at the time t−½ between the time t−1 and the time t. The motion vector detection unit 14 specifies an interpolated motion vector which represents a block of the frame at the time t−1 corresponding to each interpolated block on the basis of the detected motion vector from the frame at the time t−1 to the frame at the time t. In the same manner, the motion vector detection unit 14 specifies an interpolated motion vector which represents a block of the frame at the time t corresponding to each interpolated block. For example, the interpolated block E of the interpolated frame at the time t−½ is associated with an interpolated motion vector from the block A at the past time t−1 to the interpolated block E of the interpolated frame at the time t−½ and an interpolated motion vector from the block C at the future time t to the interpolated block E of the interpolated frame at the time t−½. In FIG. 5, the direction of the interpolated motion vector from the block C is reverse to time because the interpolated block E is drawn from the image of the block C (and the block A).

In addition, several interpolated blocks may be only associated with the blocks of any of the future and past frames. For example, in a case where a background hidden by an object in the frame at the time t−1 appears in the frame at the time t, the interpolated block positioned in the hidden background part does not have any corresponding block in the frame at the time t−1. Therefore, the interpolated block as such is associated with only the interpolated motion vector from the block in the frame at the time t.

The motion vector detection unit 14 detects an interpolated motion vector for each interpolated block of the interpolated frame. The motion vector detection unit 14 outputs information on each interpolated motion vector associated with the corresponding interpolated block to the interpolated image generation unit 15.

The respective interpolated image generation units 15 of the video signal processing units P1 to P16 generate, for the interpolated blocks of the corresponding divided areas S1 to S16, images (interpolated frame images) having the second image roughness of the interpolated frame at the time t−½ from the images having the second image roughness of the frame at the past time t−1 and the images having the second image roughness of the frame at the future time t, on the basis of the interpolated motion vectors associated with the interpolated blocks. For example, for the interpolated block E, an image of the interpolated block E is generated from an image of the block A of the frame at the time t−1, which is represented by the interpolated motion vector, and an image of the block C of the frame at the time t. The image of the interpolated block E can be made by, for example, averaging the pixel value of the image of the block A and the pixel value of the image of the block C. In addition, since the video signals having the second image roughness for the corresponding divided areas S1 to S16 are input to the interpolated image generation units 15, a high-definition interpolated frame image having the 8 k pixel count overall can be generated.

In addition, in a case where the interpolated block is not associated with only a single interpolated motion vector (the block of only one of the past and future frames is associated with the interpolated motion vector), the image of the interpolated block is generated from only the block of one of the past and future frames represented by the interpolated motion vector.

Figure 6:
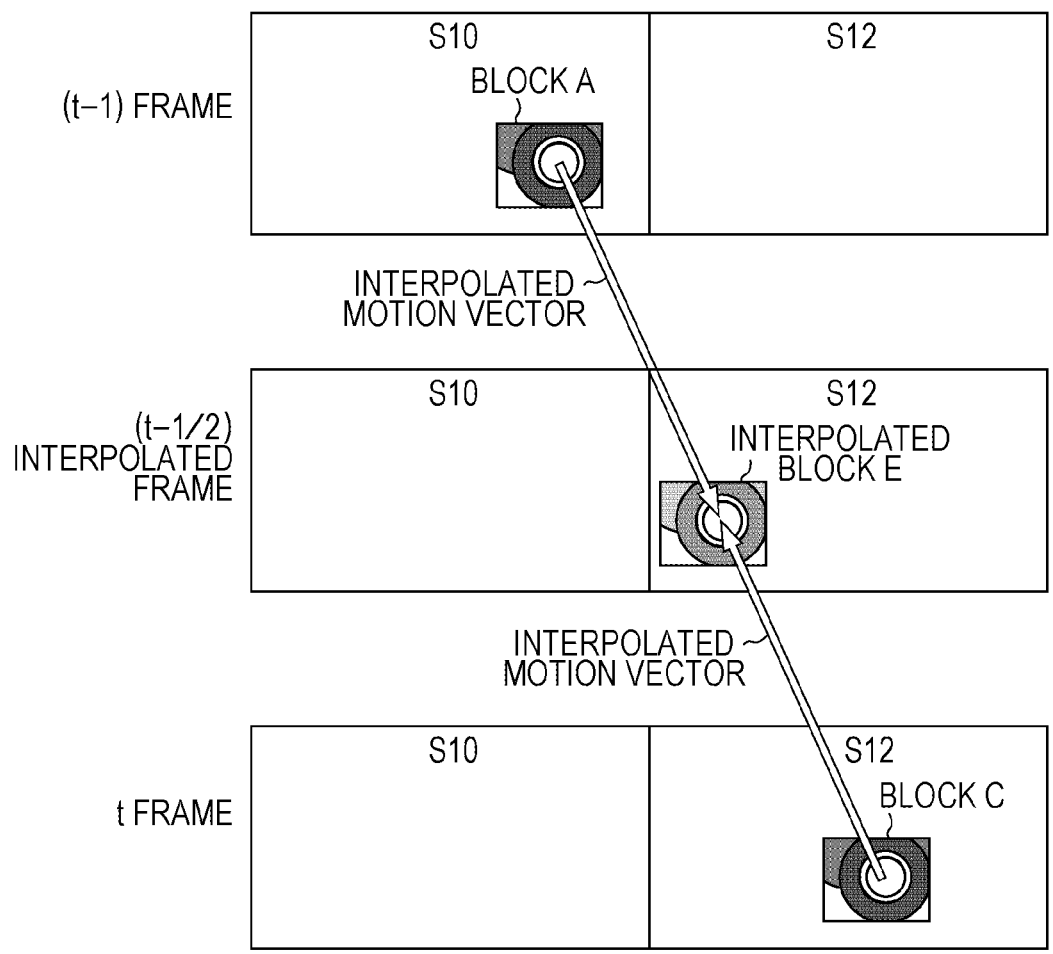
FIG. 6 is a diagram illustrating a case where an interpolated motion vector crosses over the other divided areas.

In addition, since the video signals for only corresponding divided areas S1 to S16 (¹⁄₁₆ of the entire display screen) are input to the interpolated image generation units 15, as illustrated in FIG. 6, in a case where the interpolated motion vector crosses over other divided areas S10 and S12, an idea is needed.

For example, in FIG. 6, the interpolated block E of the divided area S12 of the interpolated frame at the time t−½ is associated with an interpolated motion vector from the block A of the divided area S10 of the frame at the time t−1 and an interpolated motion vector from the block C of the divided area S12 of the frame at the time t. The interpolated image generation unit 15 of the video signal processing unit P12 which generates the interpolated frame images of the divided area S12 stores only data of the images of the divided area S12 at the time t−1 and the time t in its frame memory. Therefore, the interpolated image generation unit 15 of the video signal processing unit P12 uses an enlarged corresponding part (block A) of the image having the first image roughness input to the motion vector detection unit 14, as the image of the block A of the divided area S10 at the time t−1. The interpolated image generation unit 15 acquires image data of the part corresponding to the block A of the image having the first image roughness of the frame at the time t−1, enlarges the image size (increases the pixel count) thereof from the motion vector detection unit 14, and uses the enlarged image as the image of the block A. In addition, the image of the interpolated block E of the interpolated frame of the frame at the time t−½ is generated from the image of the block A of the frame at the time t−1 and the image of the block C of the frame at the time t. In this case, the image quality (image roughness) of the interpolated block of the part of the image of the interpolated frame is temporarily degraded, but the effect is temporary, which is not a problem.

According to this embodiment, the respective FRC circuits 12 of the video signal processing units P1 to P16 may generate the interpolated frame images of the corresponding divided areas S1 to S16 independently and in parallel and perform the frame rate conversion processing. Therefore, the FRC circuit 12 of this embodiment, which can cope with the video signal having the 8 k pixel count, can be configured by a semiconductor chip having the same size as an existing FRC circuit. In addition, each video signal processing unit can be implemented in a simple configuration without complex input and output processing of information of the plurality of video signal processing units. Therefore, the development of the video signal processing unit is facilitated. In addition, the hardware configurations and the input video signals of the motion vector detection units 14 are the same as each other in the video signal processing units P1 to P16. Therefore, there is no problem of a state of disorder in the interpolated frame images due to detection of other motion vectors by different video signal processing units P1 to P16.

Modified Example

In the case as in FIG. 6, the interpolated image generation unit 15 of the video signal processing unit P12 corresponding to the divided area S12 may generate the image of the interpolated block E of the divided area S12 of the interpolated frame on the basis of only the image of the block C of the divided area S12 of the frame at the time t. As such, the image of the interpolated block of the interpolated frame may be generated on the basis of only the image of the block in the same divided area of one of the past and future frames.

In Embodiment 1, the respective motion vector detection units 14 of the video signal processing units P1 to P16 detect the same motion vector. In order to omit the overlapping process, the video signal processing device may be configured to include only a single motion vector detection unit and allow the motion vector detection unit to output information on the detected motion vector to the interpolated image generation units 15 of the video signal processing units P1 to P16.

In addition, in Embodiment 1, the motion vector detection unit 14 obtains the motion vector of the image of the entire display screen by using the image having the full HD pixel count with the first image roughness, which is higher than the second image roughness handled by the interpolated image generation unit 15. However, the motion vector detection unit 14 is not limited thereto. A video signal having the 8 k pixel count, which represents an image (7680×4320 pixels) of the entire display screen, may be input to the motion vector detection unit, and the motion vector detection unit may detect a motion vector of the image of the entire display screen from the image having the 8 k pixel count and output the detected motion vector to the corresponding interpolated image generation unit. The interpolated image generation unit generates an interpolated frame image of the corresponding divided area as described in Embodiment 1. In this case, since the motion vector detection unit handles the entire image having the 8 k pixel count and thus the throughput thereof increased. However, each interpolated image generation unit may generate only the interpolated frame image of the corresponding divided area by using the entire motion vectors, and thus the throughput of the interpolated image generation unit can be reduced. Therefore, compared to a case where a high definition video is handled by the configuration according to the related art, processing of the interpolated image generation unit becomes faster, and thus the size of the semiconductor chip including the interpolated image generation unit can be reduced.

Figure 7:
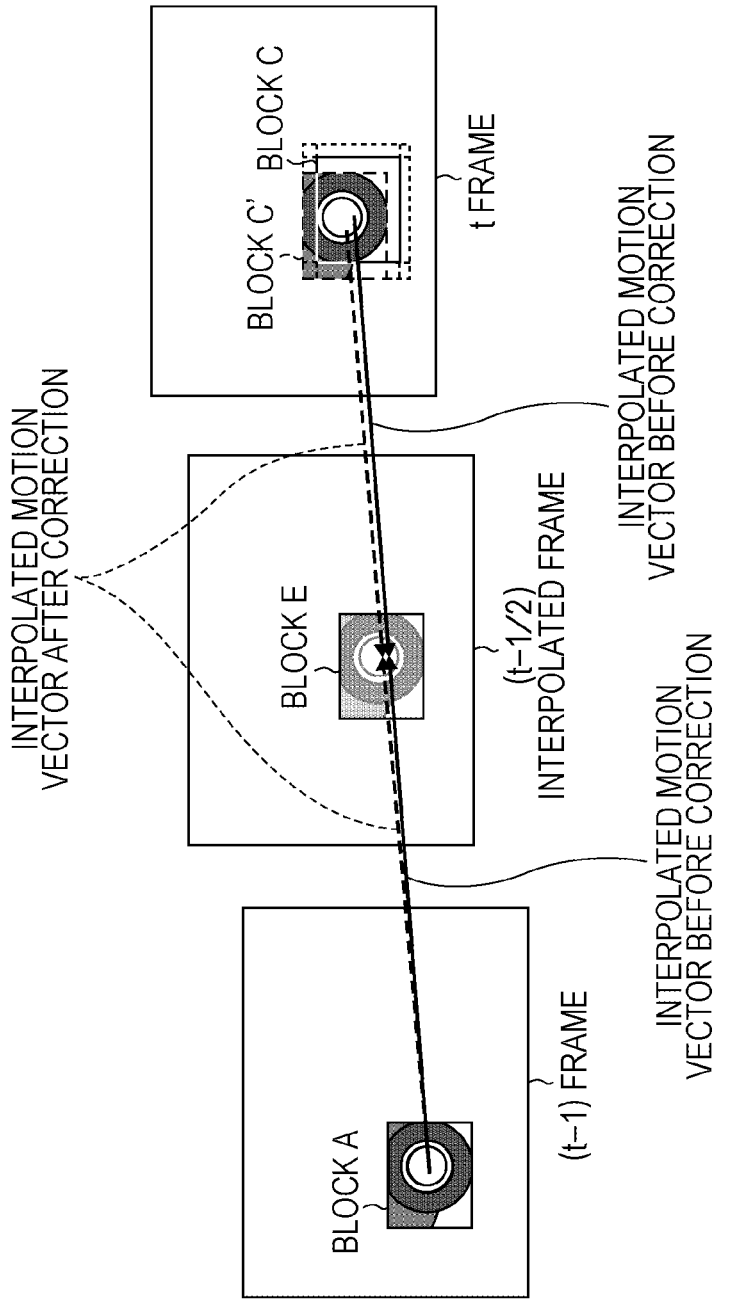
FIG. 7 is a diagram illustrating a process of correcting the interpolated motion vector.

Otherwise, the interpolated image generation unit 15 may correct, for the interpolated block of the corresponding divided area, the interpolated motion vector detected by the motion vector detection unit 14 on the basis of the image having the first image roughness, on the basis of the finer image having the second image roughness. FIG. 7 is a diagram illustrating a process of correcting the interpolated motion vector. The interpolated motion vectors detected by the motion vector detection unit 14 on the basis of the image having the first image roughness are illustrated in FIG. 7 by solid line arrows as interpolated motion vectors before correction. In addition, interpolated motion vectors corrected by the interpolated image generation unit 15 on the basis of the image having the second image roughness are illustrated in FIG. 7 by broken line arrows as interpolated motion vectors after correction.

The motion vector detection unit 14 obtains the interpolated motion vector before correction, which is associated with the block A of the frame at the time t−1 and the block C of the frame at the time t, for the interpolated block E.

The interpolated image generation unit 15 obtains the similarities between a plurality of blocks shifted from the block C of the frame at the time t in a predetermined range (for example, a range of ±4 pixels vertically and horizontally) and the block A of the frame at the time t−1, on the basis of the image having the second image roughness. The similarity between the blocks is expressed as the sum of differences in pixel values of pixels (having the second image roughness) between the blocks, as obtained by the motion vector detection unit 14. In addition, the interpolated image generation unit 15 specifies a block C' having the greatest similarity. A motion vector from the block A of the frame at the time t−1 to the block C' of the frame at the time t is the corrected motion vector. The interpolated image generation unit 15 obtains the interpolated motion vector after correction, which is associated with the interpolated block E of the interpolated frame at the time t−½, on the basis of the motion vector from the block A of the frame at the time t−1 to the block C' of the frame at the time t. Accordingly, the interpolated motion vector can be determined on the basis of the image having the second image roughness at higher accuracy. In addition, each FRC circuit 12 obtains the motion vector (interpolated motion vector) of the entire display screen from only the image having the full HD pixel count and performs correction of the interpolated motion vector for only the interpolated block of the corresponding divided area. Therefore, the hardware size of the FRC circuit 12 does not need to be significantly increased, and the processing can be performed by a semiconductor chip having the same size as an existing semiconductor chip.

In addition, the display panel is not limited to a liquid crystal display panel, and the present invention can also be applied to an organic EL display panel, a plasma display panel, or the like.

Embodiment 2

Another embodiment of the present invention will be described below. In addition, for the convenience of description, like members and configurations having the same functions as those of the figures described in Embodiment 1 are denoted by like reference numerals, and detailed description thereof will be omitted. In this embodiment, a case where a part of an image is exchanged between a plurality of video signal processing units is described.

This embodiment is different from Embodiment 1 in that each video signal processing unit acquires a part of an image having the second image roughness from the frame memories (frame data temporary storage unit) of the other video signal processing units. Therefore, in this embodiment, only the differences from Embodiment 1 will be described.

Figure 8:
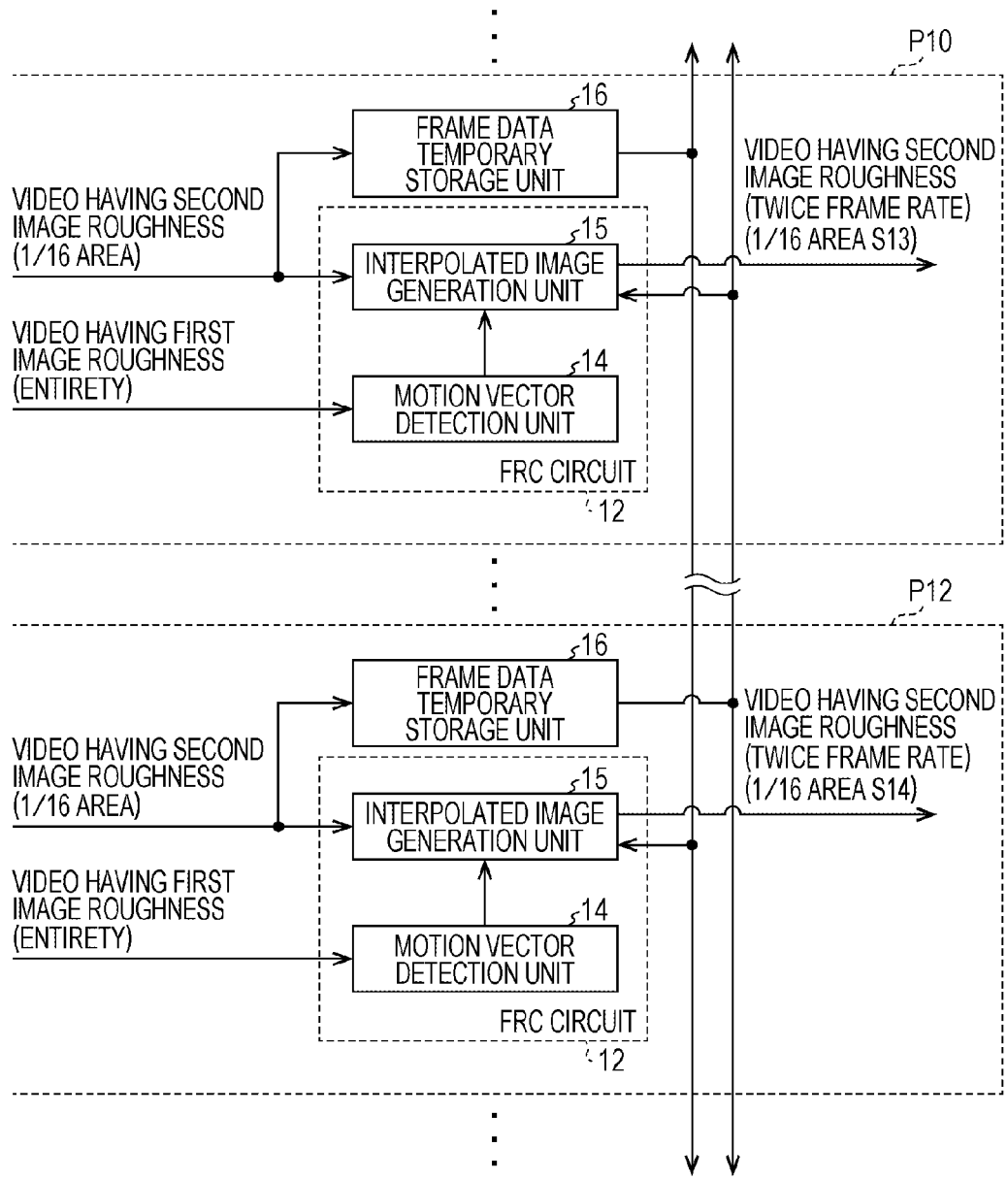
FIG. 8 is a block diagram illustrating the configuration of a part of a plurality of video signal processing units of according to another embodiment of the present invention.

FIG. 8 is a block diagram illustrating the configuration of a part of the plurality of video signal processing units P1 to P16 of this embodiment. Each of the video signal processing units P1 to P16 includes a frame data temporary storage unit 16 in addition to the FRC circuit 12. The video signal having the second roughness input to each of the video signal processing units P1 to P16 is input to the interpolated image generation unit 15 and the frame data temporary storage unit 16. The interpolated image generation units 15 receive the video signals of only the corresponding divided areas S1 to S16 (1/16 of the entire display screen).

The respective frame data temporary storage units 16 of the video signal processing units P1 to P16 temporarily store the image having the second image roughness of each frame of the corresponding divided areas S1 to S16. For example, while the interpolated image generation unit 15 performs a process of generating the interpolated frame image at the time t–½, the frame data temporary storage unit 16 stores the image having the second image roughness of the frame at the time t–1 of the corresponding divided area and the image having the second image roughness of the frame at the time t.

Here, for example, as illustrated in FIG. 6, the case where the interpolated motion vector crosses over the other divided areas S10 and S12 is described.

The interpolated block E of the divided area S12 is associated with the block C of the divided area S12 in the frame at the time t and the block A of the divided area S10 in the frame at the time t–1 by the interpolated motion vector. Therefore, the interpolated image generation unit 15 of the video signal processing unit P12 which generates the image of the interpolated block E of the divided area S12 needs image information on the block A of the divided area S10 in the frame at the time t–1. The interpolated image generation unit 15 of the video signal processing unit P12 acquires the image having the second image roughness of the block A of the divided area S10 in the frame at the time t–1 from the frame data temporary storage unit 16 of the video signal processing unit P10. Accordingly, the interpolated image generation unit 15 of the video signal processing unit P12 can generate the image of the interpolated block E of the divided area S12 in the frame at the time t–½, by using the image having the second image roughness of the block C of the divided area S12 in the frame at the time t and the image having the second image roughness of the block A of the divided area S10 in the frame at the time t–1.

The video signal processing units P1 to P16 exchange information on the images having the second image roughness of their divided areas S1 to S16 with each other. However, each interpolated image generation unit 15 may designate a partial area (block) only when the interpolated motion vector crosses over the other divided areas and acquire only the image having the second image roughness of the designated area. Therefore, the amount of information being exchanged is not increased, and the processing can be performed very simply.

In a stage of detecting a motion vector, an area which needs image information cannot be specified (that is, image information on the area of the entire display screen is needed). Therefore, when the video signal processing units exchange image information with each other in order to detect the motion vector, the throughput is greatly increased, and the processing becomes complex.

In this embodiment, in the stage in which the motion vector detection unit 14 obtains the motion vector, the video signal processing units P1 to P16 do not need to exchange information with each other, and the motion vector detection units 14 can independently detect completely the same motion vector. Therefore, each video signal processing unit can be implemented in a simple configuration without complex input and output processing of information of the plurality of video signal processing units. In addition, the FRC circuit 12 of this embodiment, which can cope with the video signal having the 8 k pixel count, can be configured by a semiconductor chip having the same size as an existing FRC circuit.

In addition, as described in the modified example of Embodiment 1, in the configuration of FIG. 8 described above, the interpolated image generation unit 15 may perform the process of correcting the interpolated motion vector by using the image having the second image roughness. In this case, even in a case where the interpolated motion vector crosses over the other divided areas, the image having the second image roughness of the block corresponding to the past and future frames of the interpolated frame can be acquired. Therefore, the interpolated motion vector can be determined on the basis of the image having the second image roughness at higher accuracy.

Embodiment 3

Another embodiment of the present invention will be described below. In addition, for the convenience of description, like members and configurations having the same functions as those of the figures described in Embodiment 1 are denoted by like reference numerals, and detailed description thereof will be omitted. In this embodiment, a case where a video signal having the 8 k pixel count in a different video format from that of Embodiment 1 is described.

Figure 9:
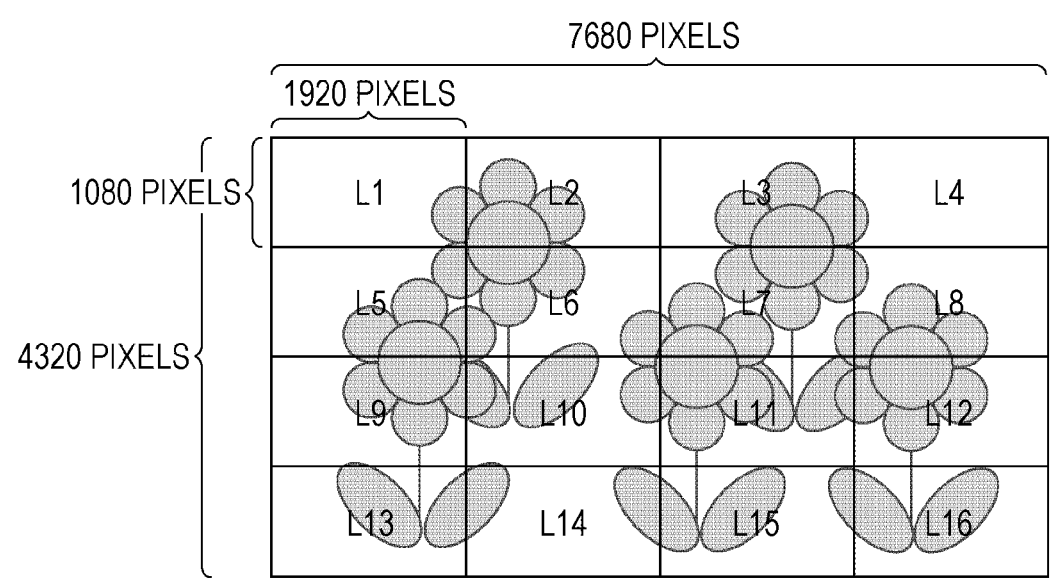
FIG. 9 is a diagram illustrating a method of dividing an image having an 8 k pixel count according to a multi-display format.

In the video format (multi-display format) described in Embodiment 1, a video signal having the 8 k pixel count is divided into individual video signals for the 16 divided areas of the display screen to be transmitted. FIG. 9 is a diagram illustrating a method of dividing an image having the 8 k pixel count according to the multi-display format. As illustrated in FIG. 9, a single image having the 8 k pixel count has 7680×4320 pixels. In the multi-display format, the entire image is divided into 16 areas. The single divided image area has 1920×1080 pixels. This is the same as a single image having the full HD pixel count, and information of pixels of the single divided image area is arranged as a single video signal and can be transmitted via an existing signal line. Here, the single image having the 8 k pixel count is converted into 16 video signals L1 to L16 for the divided image areas and the video signals L1 to L16 are respectively transmitted via 16 signal lines. The video signal of the single signal line represents an image of the divided image area (1/16 of the entire display screen). For example, when a single signal line is input to an existing display capable of displaying a video having the full HD pixel count and 16 displays are arranged (as in FIG. 9), an image having the 8 k pixel count can be displayed on the multi-display. Therefore, a method of converting a signal into different video signals for divided image areas to be transmitted is referred to as the multi-display format.

Figure 10:
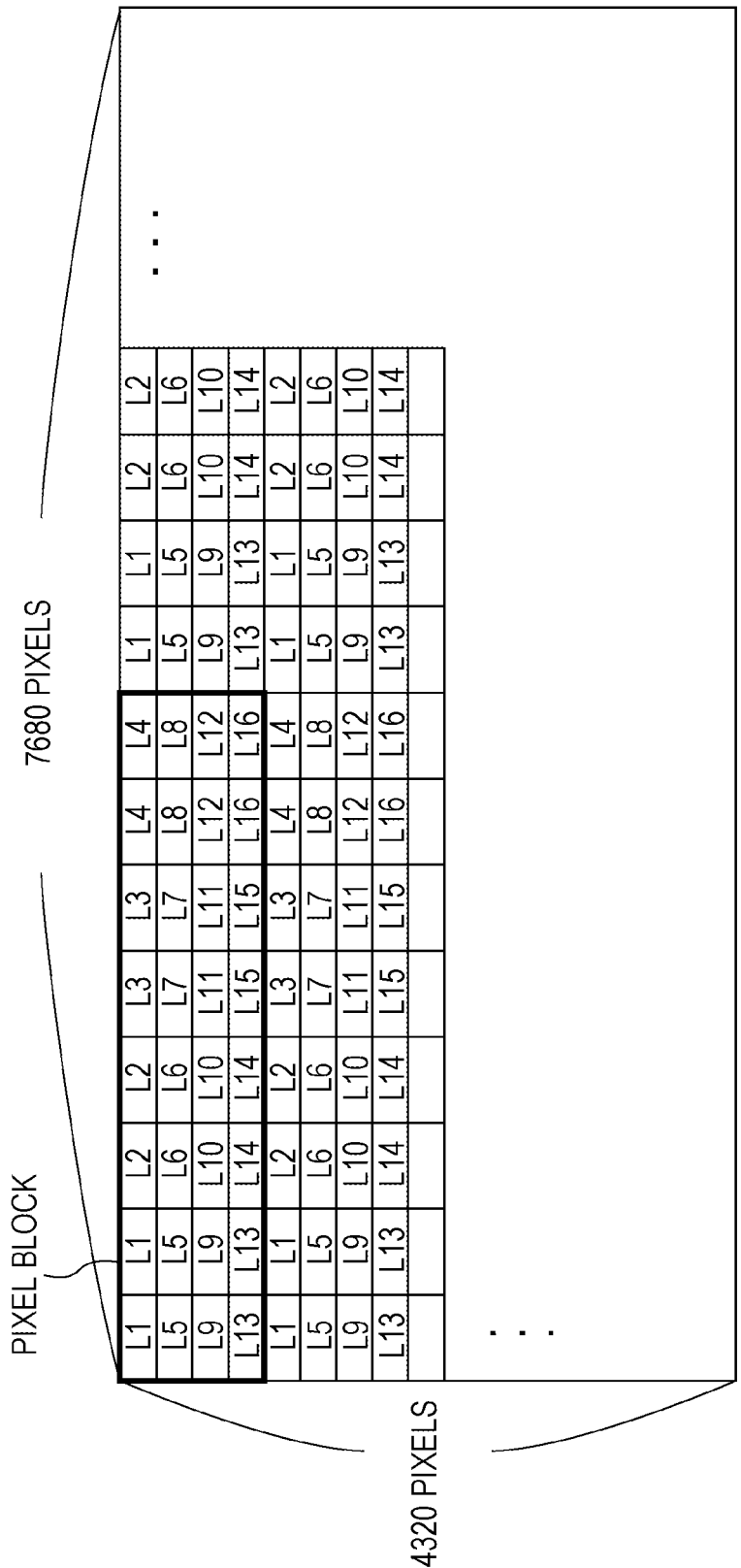
FIG. 10 is a diagram illustrating a method of dividing an image having an 8 k pixel count according to a block scan format.

In contrast, in a video format (block scan format) described in this embodiment, a method of dividing a signal into 16 video signals is different. FIG. 10 is a diagram illustrating a method of dividing an image having the 8 k pixel count according to the block scan format. In the block scan format, information of two adjacent pixels (for example, pixels of L1) in 32 pixel blocks including 8 horizontal×4 vertical blocks is included in a video signal of the same signal line. For example, in FIG. 10, pixels denoted by "L1" are extracted and information of the pixels is included in a single video signal L1. Similarly, each of the video signals L2 to L16 includes information of pixels denoted by the corresponding symbol illustrated in FIG. 10. That is, from each 8×4 pixel block, pixels of 1/16 thereof (two pixels) are extracted, and information of the extracted pixels is converted into a single video signal. For example, the video signal L1 transmitted via a single signal line has information of the pixels of "L1" illustrated in FIG. 10.

Since the pixels of "L1" are distributed over the entire original image having the 8 k resolution (per two adjacent pixels), the entire video (having the full HD pixel count) is simply expressed by the video signal L1. Therefore, there is an advantage that when any one of the sixteen divided video signals L1 to L16 is input to an existing full HD display apparatus, a simple video having the full HD pixel count corresponding to the original image can be displayed. That is, each of the video signals L1 to L16 transmitted via a total of sixteen signal lines has a full HD video signal format. An example of the block scan format is described in, for example, PTLs 3 and 4. In addition, when four signals (for example, L1, L3, L9, and L11) among the sixteen divided video signals L1 to L16 are used as input video signals, a video having a 4 k resolution can be simply displayed.

Figure 11:
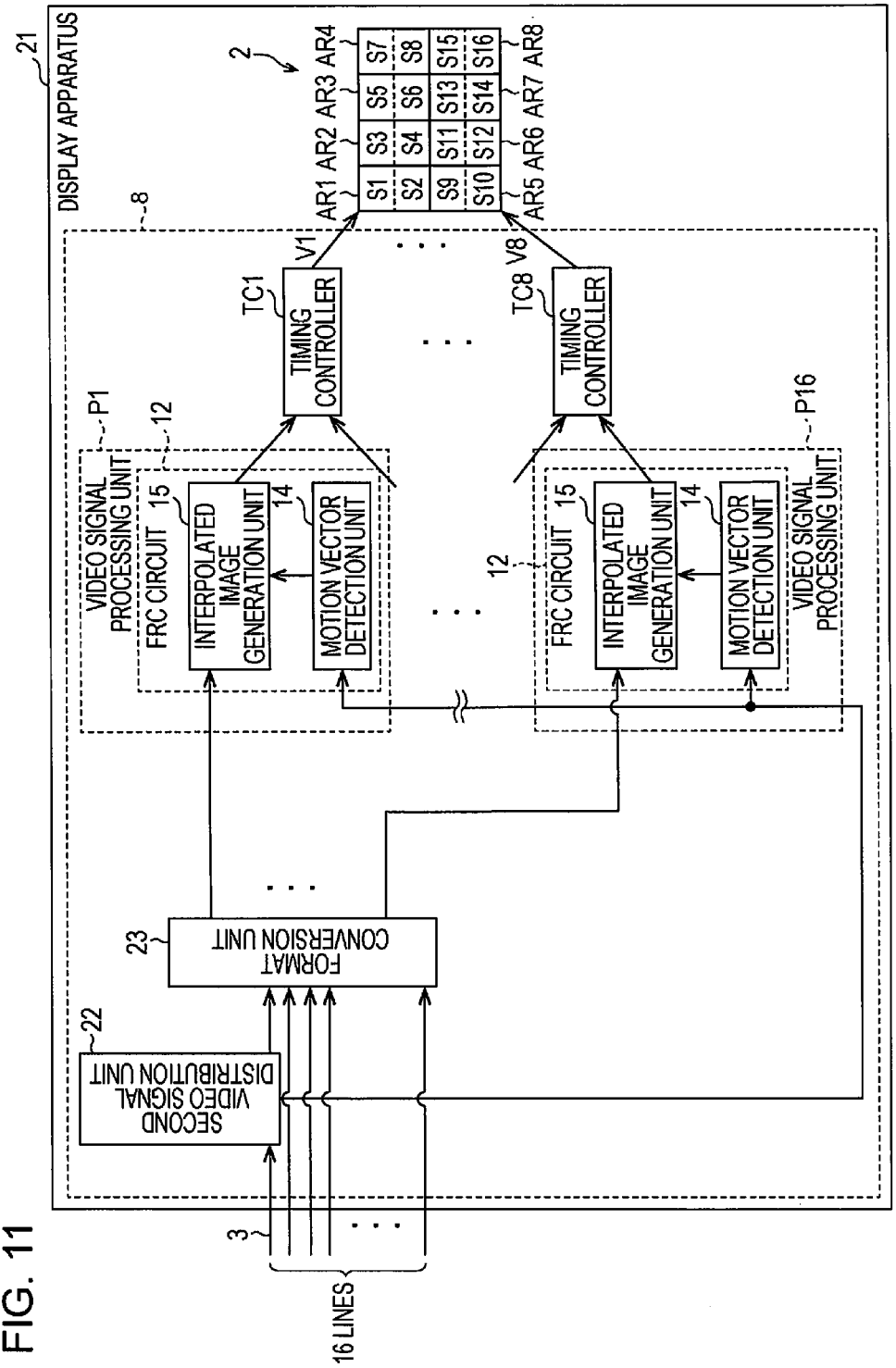
FIG. 11 is a block diagram illustrating the configuration of a display apparatus according to still another embodiment of the present invention, which corresponds to an input video signal having the block scan format.

FIG. 11 is a block diagram illustrating the configuration of a display apparatus 21 of this embodiment corresponding to the input video signal having the block scan format. The display apparatus 21 includes a display panel 2 and a video signal processing device 8. The video signal processing device 8 includes a second video signal distribution unit (first video signal outputting unit) 22, a format conversion unit (second video signal outputting unit) 23, and sixteen video signal processing units P1 to P16. In addition, the video signal processing units P1 to P16 have the same configuration as described in Embodiment 1. Here, the resolution conversion unit 11 is omitted in FIG. 11.

Sixteen input signal lines 3 for inputting video signals from the outside are connected to the display apparatus 21. The input signal line 3 is a signal line through which a full HD video signal can be transmitted in real time. In this embodiment, a video signal having the 8 k pixel count in the block scan format is input to the display apparatus 21 using the sixteen input signal lines 3. Among the video signals input to the display apparatus 21 from the sixteen input signal lines 3, a single video signal is input to the second video signal distribution unit 22. In addition, among the video signals input to the display apparatus 21, the other fifteen video signals are input to the format conversion unit 23. Furthermore, since any of the sixteen divided video signals L1 to L16 represents an image of the entire display screen, the video signal of an arbitrary single input signal line 3 may be input to the second video signal distribution unit 22.

The second video signal distribution unit 22 receives one of the video signals input to the display apparatus 21 and outputs the input video signal to the format conversion unit 23. In addition, the second video signal distribution unit 22 outputs the input video signal to the motion vector detection unit 14 of each of the video signal processing units P1 to P16. The single video signal input to the motion vector detection unit 14 corresponds to one of the sixteen signals divided by the block scan format and is thus the same as the video signal having the full HD pixel count which represents the image of the entire display screen.

Here, the display panel 2 receives the video signal for each of the partial display areas AR1 to AR8 for a display, and thus video signals V1 to V8 input to the display panel 2 have to be divided to respectively correspond to the partial display areas AR1 to AR8. That is, the video signal in the block scan format needs to be converted into a video signal in the multi-display format.

The format conversion unit 23 converts the input video signal having the 8 k pixel count (the sixteen video signals divided by the block scan format) into a video signal having the multi-display format. Specifically, the format conversion unit 23 stores the images of the sixteen input video signals in its frame memory, rearranges the pixels, and generates an image having the 8 k pixel count which represents the entire display screen. Furthermore, the format conversion unit 23 generates sixteen video signals (image data) having the multi-display format divided to correspond to the divided areas S1 to S16 from the image having the 8 k pixel count which represents the entire display screen. The format conversion unit 23 outputs the sixteen video signals (the video signals having the multi-display format) respectively corresponding to the divided areas S1 to S16 to the interpolated image generation units 15 of the corresponding video signal processing units P1 to P16.

Accordingly, as in Embodiment 1, the video signal having the full HD pixel count (but having the low image roughness) which represents an image of 1/16 of the display screen and for the corresponding divided areas S1 to S16 is input to the interpolated image generation unit 15 of each of the video signal processing units P1 to P16, and the video signal having the full HD pixel count (and having the high image roughness) which represents the image of the entire display screen is input to the motion vector detection unit 14 of each of the video signal processing units P1 to P16.

The subsequent processing is the same as that of Embodiment 1 and thus detailed description thereof will be omitted.

According to this embodiment, the video signal having the 8 k pixel count, which is divided according to the block scan format and is transmitted through the sixteen signal lines, is input to the display apparatus 21. The video signal of the single signal line among the sixteen signal lines is the same as the video signal having the full HD pixel count, which represents the image of the entire display screen. Therefore, the video signal input to the single signal line among the sixteen signal lines can be input to the motion vector detection unit 14 of each of the video signal processing units P1 to P16 as it is. Each of the motion vector detection units 14 can use the input video signal having the block scan format to detect the motion vector.

Other Embodiments

A video signal processing device according to an embodiment of the present invention includes: when different partial areas in a predetermined display area are respectively a first area and a second area, a motion vector detection unit which detects, by using a first broad image corresponding to the display area of a first frame and a second broad image corresponding to the display area of a second frame, a motion vector which represents a motion between the first broad image and the second broad image; a first interpolated partial image generation unit which generates, by using a first partial image corresponding to the first area of the first frame, a second partial image corresponding to the first area of the second frame, and the motion vector, a first interpolated partial image that is inserted between the first frame and the second frame and corresponds to the first area; and a second interpolated partial image generation unit which generates, by using a third partial image corresponding to the second area of the first frame, a fourth partial image corresponding to the second area of the second frame, and the motion vector, a second interpolated partial image that is inserted between the first frame and the second frame and corresponds to the second area.

In the above-described configuration, the motion vector detection unit can accurately detect the motion vector by using the first broad image and the second broad image corresponding to the display area, the first interpolated partial image generation unit generates the first interpolated partial image corresponding to the first area by using the first partial image and the second partial image corresponding to the first area which are parts of the display area, and the second interpolated partial image generation unit generates the second interpolated partial image corresponding to the second area by using the third partial image and the fourth partial image corresponding to the second area which are parts of the display area. Therefore, the first and second interpolated partial image generation units can generate the interpolated partial images for each corresponding area in parallel. Accordingly, the throughput of each interpolated partial image generation unit can be reduced, and a semiconductor chip for implementing the interpolated partial image generation unit can be implemented in a simple configuration. In addition, frame rate conversion processing which requires information of the images of the display area can be performed at a high speed.

In addition, the first interpolated partial image generation unit and the second interpolated partial image generation unit may be configured by separate semiconductor chips.

In the above-described configuration, the frame rate conversion processing can be performed without an increase in the size of the individual semiconductor chip for implementing each interpolated partial image generation unit.

In addition, the first broad image and the second broad image may be images having a first image roughness, and the first partial image, the second partial image, the third partial image, the fourth partial image, the first interpolated partial image, and the second interpolated partial image may be images having a second image roughness which is lower than the first image roughness.

In the above-described configuration, the motion vector detection unit can simply detect the motion vector of the display area by using the first broad image and the second broad image having a high image roughness, and each of the interpolated partial image generation units can generate the interpolated partial image by using the corresponding partial image which has a lower image roughness by using the detected motion vector. Therefore, processing of the motion vector detection unit can be performed at a high speed, and each of the interpolated partial image generation units can generate the interpolated partial image having a low image roughness for each corresponding area.

In addition, the first broad image may be obtained by dividing a third broad image having the second image roughness corresponding to the display area of the first frame into a plurality of images according to a block scan format, and the second broad image may be obtained by dividing a fourth broad image having the second image roughness corresponding to the display area of the second frame into a plurality of images according to the block scan format.

For example, the video signal processing device may be configured to include: a first video signal outputting unit which outputs one corresponding video signal among a plurality of video signals having the first image roughness, which are divided according to the block scan format and are input, to the motion vector detection unit; and a second video signal outputting unit which receives the plurality of video signals having the first image roughness, which are divided according to the block scan format, converts the plurality of video signals into a first video signal having the second image roughness and a second video signal having the second image roughness to respectively correspond to the first area and the second area, and respectively outputs the first video signal and the second video signal to the first interpolated partial image generation unit and the second interpolated partial image generation unit.

Among the video signals having the block scan format, any of the divided video signals represents an image having a low resolution of the entire display area.

In the above-described configuration, the image represented by one video signal of the plurality of video signals divided according to the block scan format is the first broad image and the second broad image, and thus the motion vector detection unit can use the video signal as it is. Therefore, the input video signal having a high resolution does not need to be converted into a video signal having a low resolution so as to be used by the motion vector detection unit.

In addition, in a case where the motion vector for generating the first interpolated partial image corresponding to the first area crosses over the other second area, the first interpolated partial image generation unit may acquire an image having the first roughness of a part associated with the motion vector in the second area from the motion vector detection unit, and generate the first interpolated partial image corresponding to the first area by using the acquired image.

In the above-described configuration, in the case where the motion vector for generating the first interpolated partial image corresponding to the first area crosses over the other second area, the first interpolated partial image generation unit acquires the image of the other second area from the motion vector detection unit. The first and second broad images which have a high image roughness but represent the entire display area are input to the motion vector detection unit. Therefore, the first interpolated partial image generation unit can generate the first interpolated partial image by using the first or second broad image having the first image roughness instead. Accordingly, when the first interpolated partial image generation unit generates the interpolated partial image, the first interpolated partial image generation unit does not need to exchange information with other interpolated partial image generation units. Therefore, the interpolated partial image generation units can perform processing independently and in parallel. In addition, it is thought that an object represented by the motion vector that crosses over the other areas in a certain interpolated frame moves to another space in the next interpolated frame. Therefore, using the first or second broad image having the high image roughness is temporary, and thus hardly affects the visual effect.

In addition, in the case where the motion vector for generating the first interpolated partial image corresponding to the first area crosses over the other second area, the first interpolated partial image generation unit may acquire an image having the second roughness of a part associated with the motion vector in the second area from the second interpolated partial image generation unit, and generate the first interpolated partial image corresponding to the first area by using the acquired image.

In the above-described configuration, in the case where the motion vector for generating the first interpolated partial image corresponding to the first area crosses over the other second area, the first interpolated partial image generation unit acquires an image of the second area from the second interpolated partial image generation unit corresponding to the second area. The image to be acquired is an image of a part associated with the motion vector in the second area, and since the range is known, the amount of information exchanged between the interpolated partial image generation units is small. Therefore, the first interpolated partial image generation unit can be implemented in a simple configuration.

In addition, the first interpolated partial image generation unit and the second interpolated partial image generation unit may respectively generate the first interpolated partial image and the second interpolated partial image independently and in parallel.

In a case where the process of generating the interpolated partial image is performed independently and in parallel, the interpolated partial image generation units do not need to exchange information with each other, and each of the interpolated partial image generation units can be implemented in a simple configuration.

In addition, the first interpolated partial image generation unit may correct the motion vector by shifting an area associated with the motion vector detected by the motion vector detection unit to a predetermined range in the first partial image or the second partial image having the second image roughness.

In the above-described configuration, regarding the motion vector detected by the motion vector detection unit from the image having the high image roughness, the motion vector is corrected on the basis of the image having the low image roughness in the first interpolated image generation unit. Therefore, the motion vector can be specified at higher accuracy.

A display apparatus according to the present invention includes: the video signal processing device; and a display unit. The video signal processing device outputs a video signal of which a frame rate has been increased to the display unit, and the display unit displays an image represented by the video signal of which the frame rate has been increased and which has been received from the video signal processing device.

In the above-described configuration, the frame rate conversion processing can be performed at a high speed with a simple configuration, and the image of which the frame rate has been increased can be displayed.

The present invention is not limited to each of the embodiments described above. Various modifications can be made without departing from the scope of the claims, and an embodiment that can be obtained by appropriately combining technical means disclosed in different embodiments is included in the technical scope of the present invention.

INDUSTRIAL APPLICABILITY

The present invention can be used for a display apparatus which performs a display by increasing the frame rate of an input video signal.

REFERENCE SIGNS LIST 1, 21 DISPLAY APPARATUS
2 DISPLAY PANEL (DISPLAY UNIT)
3 INPUT SIGNAL LINE
4 VIDEO SIGNAL DETERMINATION UNIT
5 REDUCTION SYNTHESIS UNIT
6 FIRST VIDEO SIGNAL DISTRIBUTION UNIT
7, 8 VIDEO SIGNAL PROCESSING DEVICE
11 RESOLUTION CONVERSION UNIT
12 FRC CIRCUIT
14 MOTION VECTOR DETECTION UNIT
15 INTERPOLATED IMAGE GENERATION UNIT (INTERPOLATED PARTIAL IMAGE GENERATION UNIT)
16 FRAME DATA TEMPORARY STORAGE UNIT
22 SECOND VIDEO SIGNAL DISTRIBUTION UNIT (FIRST VIDEO SIGNAL OUTPUTTING UNIT)
23 FORMAT CONVERSION UNIT (SECOND VIDEO SIGNAL OUTPUTTING UNIT)
TC1 TO TC8 TIMING CONTROLLER
P1 TO P16 VIDEO SIGNAL PROCESSING UNIT

The invention claimed is:

1. A video signal processing device, different partial areas in a display area being respectively a first area and a second area comprising:
a motion vector detection circuit to detect, by using a first broad image corresponding to the display area of a first frame and a second broad image corresponding to the display area of a second frame, a motion vector which represents a motion between the first broad image and the second broad image;
a first interpolated partial image generation circuit to generate, by using a first partial image corresponding to the first area of the first frame, a second partial image corresponding to the first area of the second frame, and the motion vector, a first interpolated partial image that is inserted between the first frame and the second frame and corresponds to the first area; and
a second interpolated partial image generation circuit to generate, by using a third partial image corresponding to the second area of the first frame, a fourth partial image corresponding to the second area of the second frame, and the motion vector, a second interpolated partial image that is inserted between the first frame and the second frame and corresponds to the second area, wherein the first area and the second area do not overlap each other.

2. The video signal processing device according to claim 1,
wherein the first interpolated partial image generation circuit and the second interpolated partial image generation circuit are configured by separate semiconductor chips.

3. The video signal processing device according to claim 1,
wherein the first broad image and the second broad image are images having a first image roughness, and
the first partial image, the second partial image, the third partial image, the fourth partial image, the first interpolated partial image, and the second interpolated partial image are images having a second image roughness which is relatively lower than the first image roughness.

4. The video signal processing device according to claim 3,
wherein the first broad image is obtained by dividing a third broad image having the second image roughness corresponding to the display area of the first frame into a plurality of images according to a block scan format, and
the second broad image is obtained by dividing a fourth broad image having the second image roughness corresponding to the display area of the second frame into a plurality of images according to the block scan format.

5. A video signal processing device, different partial areas in a display area being respectively a first area and a second area, comprising:
a motion vector detection circuit to detect, by using a first broad image corresponding to the display area of a first frame and a second broad image corresponding to the display area of a second frame, a motion vector which represents a motion between the first broad image and the second broad image;

a first interpolated partial image generation circuit to generate, by using a first partial image corresponding to the first area of the first frame, a second partial image corresponding to the first area of the second frame, and the motion vector, a first interpolated partial image that is inserted between the first frame and the second frame and corresponds to the first area; and a second interpolated partial image generation circuit to generate, by using a third partial image corresponding to the second area of the first frame, a fourth partial image corresponding to the second area of the second frame, and the motion vector, a second interpolated partial image that is inserted between the first frame and the second frame and corresponds to the second area, wherein the first broad image and the second broad image are images having a first image roughness, and the first partial image, the second partial image, the third partial image, the fourth partial image, the first interpolated partial image, and the second interpolated partial image are images having a second image roughness which is relatively lower than the first image roughness, wherein the first broad image is obtained by dividing a third broad image having the second image roughness corresponding to the display area of the first frame into a plurality of images according to a block scan format, and the second broad image is obtained by dividing a fourth broad image having the second image roughness corresponding to the display area of the second frame into a plurality of images according to the block scan format;

a first video signal outputting unit to output one corresponding video signal among a plurality of video signals having the first image roughness, which are divided according to the block scan format and are input, to the motion vector detection unit; and a second video signal outputting unit to receive the plurality of video signals having the first image roughness, which are divided according to the block scan format, converts the plurality of video signals into a first video signal having the second image roughness and a second video signal having the second image roughness to respectively correspond to the first area and the second area, and respectively outputs the first video signal and the second video signal to the first interpolated partial image generation circuit and the second interpolated partial image generation circuit.

6. The video signal processing device according to claim 3, wherein, in a case where the motion vector for generating the first interpolated partial image corresponding to the first area crosses over the other second area, the first interpolated partial image generation circuit acquires an image having the first roughness of a part associated with the motion vector in the second area from the motion vector detection circuit, and generates the first interpolated partial image corresponding to the first area by using the acquired image.

7. A video signal processing device, different partial areas in a display area being respectively a first area and a second area, comprising:

a motion vector detection circuit to detect, by using a first broad image corresponding to the display area of a first frame and a second broad image corresponding to the display area of a second frame, a motion vector which represents a motion between the first broad image and the second broad image;

a first interpolated partial image generation circuit to generate, by using a first partial image corresponding to the first area of the first frame, a second partial image corresponding to the first area of the second frame, and the motion vector, a first interpolated partial image that is inserted between the first frame and the second frame and corresponds to the first area; and a second interpolated partial image generation circuit to generate, by using a third partial image corresponding to the second area of the first frame, a fourth partial image corresponding to the second area of the second frame, and the motion vector, a second interpolated partial image that is inserted between the first frame and the second frame and corresponds to the second area, wherein the first broad image and the second broad image are images having a first image roughness, and the first partial image, the second partial image, the third partial image, the fourth partial image, the first interpolated partial image, and the second interpolated partial image are images having a second image roughness which is relatively lower than the first image roughness and wherein, in a case where the motion vector for generating the first interpolated partial image corresponding to the first area crosses over the other second area, the first interpolated partial image generation circuit acquires an image having the second roughness of a part associated with the motion vector in the second area from the second interpolated partial image generation circuit, and generates the first interpolated partial image corresponding to the first area by using the acquired image.

8. The video signal processing device according to claim 1, wherein the first interpolated partial image generation circuit and the second interpolated partial image generation circuit respectively generate the first interpolated partial image and the second interpolated partial image independently and in parallel.

9. The video signal processing device according to claim 3, wherein the interpolated partial image generation circuit corrects the motion vector by shifting an area associated with the motion vector detected by the motion vector detection circuit to a predetermined range in the first partial image or the second partial image having the second image roughness.

10. A display apparatus comprising:
the video signal processing device of claim 1; and
a display unit,
wherein the video signal processing device is configured to output a video signal of which a frame rate has been relatively increased to the display unit, and
wherein the display unit is configured to display an image represented by the video signal of which the frame rate has been relatively increased and which has been received from the video signal processing device.

11. A display apparatus comprising:
the video signal processing device of claim 5; and
a display unit,
wherein the video signal processing device is configured to output a video signal of which a frame rate has been relatively increased to the display unit, and wherein the display unit is configured to display an image represented by the video signal of which the frame rate has been relatively increased and which has been received from the video signal processing device.

12. A display apparatus comprising:
the video signal processing device of claim 7; and
a display unit,
wherein the video signal processing device is configured to output a video signal of which a frame rate has been relatively increased to the display unit, and
wherein the display unit is configured to display an image represented by the video signal of which the frame rate has been relatively increased and which has been received from the video signal processing device.

\* \* \* \* \*